United States Patent

Van Walraven

[11] Patent Number: 5,384,936
[45] Date of Patent: Jan. 31, 1995

[54] PIPE-CLIP

[75] Inventor: Jan Van Walraven, GP Mijdrecht, Netherlands

[73] Assignee: J. van Walraven B.V., Mijdrecht, Netherlands

[21] Appl. No.: 958,361

[22] PCT Filed: May 8, 1992

[86] PCT No.: PCT/NL92/00085

§ 371 Date: Sep. 10, 1993

§ 102(e) Date: Sep. 10, 1993

[30] Foreign Application Priority Data

May 8, 1991 [NL] Netherlands ............... 9100793

[51] Int. Cl.⁶ ............................................. F16L 33/04
[52] U.S. Cl. ............................................. 24/279
[58] Field of Search ..................... 248/74.1, 74.5; 285/367; 24/279, 284, 285, 20 CS

[56] References Cited

U.S. PATENT DOCUMENTS 3,995,795 12/1976 Hogan .

FOREIGN PATENT DOCUMENTS

| 0188649A1 | 1/1985  | European Pat. Off. . |         |
|-----------|---------|----------------------|---------|
| 387967    | 9/1990  | European Pat. Off.   | 248/74.1|
| 413883    | 2/1991  | European Pat. Off.   | 248/74.1|
| 2092351   | 1/1972  | France .             |         |
| 2457403   | 12/1980 | France .             |         |
| 3230800   | 2/1984  | Germany              | 248/74.1|
| 3346423   | 8/1984  | Germany              | 248/74.1|
| 3708066   | 9/1988  | Germany              | 248/74.1|
| 8806714   | 10/1988 | Germany .            |         |

*Primary Examiner*—James R. Brittain
*Attorney, Agent, or Firm*—Frishauf, Holtz, Goodman & Woodward

[57] ABSTRACT

A pipe-clip is provided with a lining of an elastomeric material. A first flange of the pipe-clip has an outwardly opening slot for receiving a shank of a fastening screw, whereas an auxiliary flange is provided on a side of a second flange that is turned away from the first flange, the auxiliary flange having a nut for the fastening screw. The auxiliary flange having a lying against the side of the second flange that is turned away from the first flange, but may, against a spring action turn through a certain angle away from the second flange about an axis located adjacent a transition between the annular clip body and the second flange. The auxiliary flange, having the fastening nut, and the lining are formed of one piece of elastomeric material transverse slit is formed at the transition between the lining proper and the auxiliary flange through which the second flange extends.

8 Claims, 1 Drawing Sheet

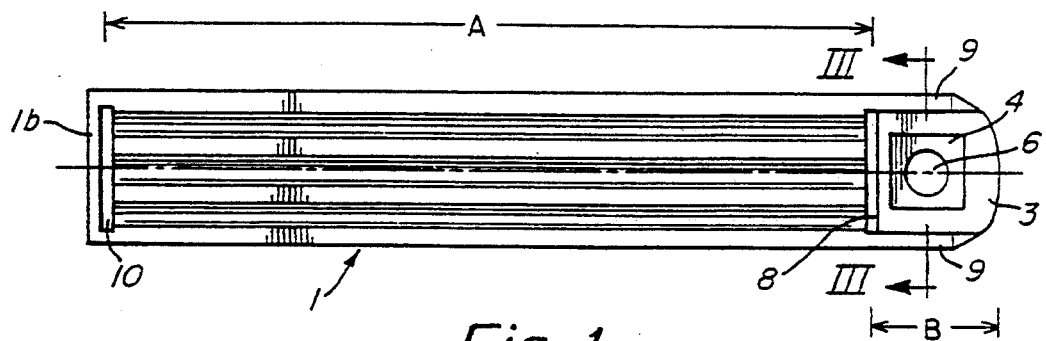
Fig. 1
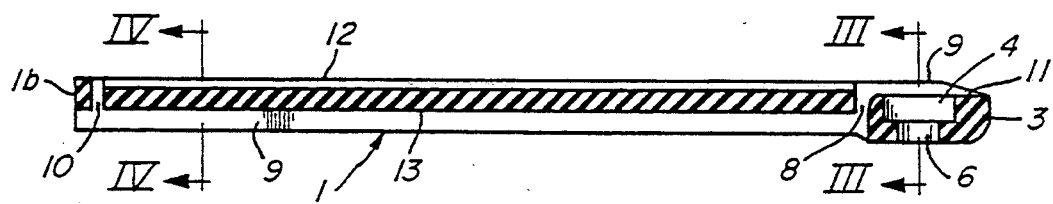
Fig. 2
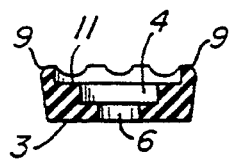 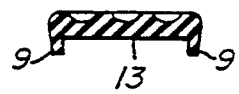 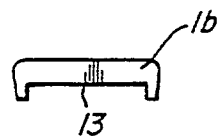
Fig. 3  Fig. 4  Fig. 5
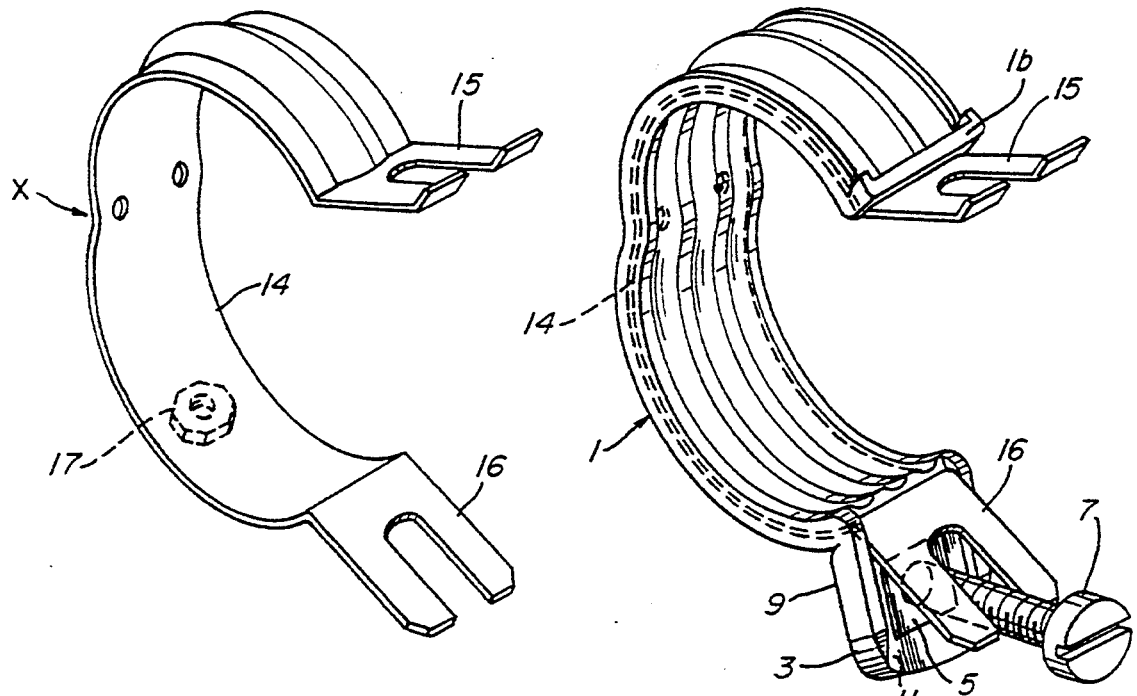
Fig. 6  Fig. 7

PIPE-CLIP

BACKGROUND OF THE INVENTION

1. Field of the Invention

The invention relates to a pipe-clip, comprising an annular clip body having on its inner side a lining of an elastomeric material and having both of its ends bent into flanges which are to be pulled together by means of a fastening screw, one of said flanges having an outwardly opening slot for receiving the shank of the fastening screw, whereas an auxiliary flange comprising the nut for the fastening screw is provided at and normally engages that side of the second flange that is turned away from the first flange, said auxiliary flange cooperating with the lining on the inner side of the clip body in such a way that it may bend away from said second flange through a certain angle about an axis that is located adjacent the transition between the annular clip body and the second flange so as to cause the fastening screw, that is threaded through a slot-like opening in the second flange into the nut, to tilt outwardly.

2. Description of the Prior Art

Such a pipe-clip is known from EP-A-0188649. Such pipe-clips are tightened, from a spread-open state, around the pipe to be fastened. When moving the flanges together the fastening screw, which has been initially screwed through the second flange into the nut of the auxiliary flange, will at first—under the pressure of the first flange onto the head of the screw—tilt outwardly and then—after the first flange has passed—tilt back resiliently and engage with its shank into the slot of the first flange.

With the pipe-clip according to EP-A-0188649 the auxiliary flange is formed of metal and provided with a hooked lip, that extends through an opening in the respective end of the annular clip body and is pressed against the inner side of the annular clip body due to the resilience of the lining. When applying the clip body around a pipe to be fastened the lip may, against the resilience of the lining, turn inwardly which allows the auxiliary flange with the fastening screw premounted therein to turn away from the second flange under the pressure of the first flange. As soon as the fastening screw is free to tilt back, the resilience of the lining will cause the lip and therefore the auxiliary flange with the fastening screw mounted therein to turn back into the fastening position.

SUMMARY OF THE INVENTION

The invention aims at providing a pipe-clip of the type described hereinabove, which is of a simpler construction and may be more easily assembled from its parts.

In accordance with the invention this aim is achieved in that the auxiliary flange, carrying the fastening nut, and the lining are formed of one strip of elastomeric material, a transverse slit being provided at the transition between the lining proper and the auxiliary flange, through which slit the second flange extends.

This construction implies that the portion of the strip that is functioning as an auxiliary flange is connected with the lining proper by continuing edge portions and that the auxiliary flange portion will normally lie against the second flange due to the resilience of the strip of elastomeric material.

Preferably another transverse slit is provided at the other end of the strip of elastomeric material, through which slit the first flange extends.

It is to be noted that FR-A-2 457 403 discloses a pipe-clip, comprising an annular clip body the ends of which are bent to flanges, which are to be pulled together by means of a fastening screw, said clip body being provided with a lining formed of a strip of elastomeric material, said lining strip having at one end a transverse slit through which the clip body extends. With this pipe-clip, however, there is no outwardly opening slot in one of the flanges, and there is neither an auxiliary flange carrying the nut for the fastening screw.

It should also be noted, that, although hereinabove mention is made of a clip body bent to a (complete) annulus, this does not necessarily mean, that the clip body consisting of one piece. The invention is also applicable to a clip body consisting of two parts. The two clip body parts may be interconnected—diametrically opposite the (first and second) flanges—in various manners. As an example the connection may be a pivoting hook-connection of the type shown in FIG. 1 of DE-U-8 806 713, in which case the lining on the inner side of the clip body is continuing at the pivot location and is covering a complete annulus just as with an integrally formed clip body. It would also be possible, however, to apply a second flange-connection, in which case there would, in fact, be two semi-circular clips, one serving as a pipe support and the other functioning as a closure clip. In that case the support part will have a "second" flange and an auxiliary flange at both ends, whereas the close clip will have two flanges which are each provided with an outwardly opening slot. In this case the lining for the pipe support part will have an end portion functioning as an auxiliary flange and a transverse slit for the "second" flanges at both sides.

BRIEF DESCRIPTION OF THE DRAWINGS

The invention will be hereinafter explained by way of example with reference to the accompanying drawings.

FIG. 1 is a plan view of a strip-shaped lining for a pipe-clip according to the invention;

FIG. 2 is a longitudinal section of the lining of FIG. 1;

FIG. 3 is a cross-section along the line III—III in FIGS. 1 and 2.

FIG. 4 is a cross-section along the line IV—IV in FIG. 2;

FIG. 5 is an end view as seen from the left in FIG. 2;

FIG. 6 shows a one-piece pipe-clip without a lining and

FIG. 7 shows the pipe-clip according to the invention assembled from the lining of FIGS. 1—5 and the pipe-clip of FIG. 6.

DETAILED DESCRIPTION

The lining 1 shown in FIG. 1-3 consists of a strip of an elastomeric material, such as rubber. The portion A of this strip constitutes the lining proper, the length of which corresponds with the inner circumferential length of the pipe-clip shown in FIG. 6. The strip is extended at one end by a portion B that is to function as an auxiliary flange 3 and is provided with a recess for receiving a fastening nut 5 (FIG. 7) and with a through hole 6 for the threaded shank end portion of a fastening screw (FIG. 7) that cooperates with the nut 5. A transverse slit 8 is provided at the transition between the lining portion A and the auxiliary flange portion B between the lining portion A and the auxiliary flange portion B so that the connection between the lining portion A and the auxiliary flange portion is formed by the continuing longitudinal edge portions 9.

At the end turned away from the auxiliary flange portion B the lining strip 1 has a second transverse slit 10.

As is shown in FIG. 2 the plane 11 of the auxiliary flange portion is slightly sunk relative to the plane 12 of the lining portion A such that the longitudinal edge portions 9 are projecting slightly upwardly from the plane 11 in the region of the auxiliary portion B, whereas in the region of the portion A said longitudinal edge portions 9 are extending downwardly from the plane 13.

The pipe-clip shown in FIG. 6 consists of an annular clip body 14 that is bent from a metal strip and the ends of which are bent into a first flange 15 and a second flange 16 respectively, which may be pulled together by means of a fastening screw 7 and a corresponding nut 5 (FIG. 7). The clip body 14 may consist of two parts, if desired, which are hooked into one another at x so as to hinge in a plane perpendicular to the axis of the pipe to be clamped.

The width of the clip body corresponds with the spacing between the projecting longitudinal edge portions 9 of the strip of elastomeric material shown in FIGS. 1–5.

A nut 17 is welded to the clip body 14 by means of which the clip body (to be clamped around a pipe) may be connected to a threaded rod.

FIG. 7 shows the pipe-clip of the invention obtained by applying the lining of FIGS. 1–5 to the pipe-clip of FIG. 6. The lining of FIG. 1–5 is thereby—with the side 13 facing towards the inner circumferential face of the pipe-clip of FIG. 6—slid with its transverse slits 8 and 10 over the ends of the flanges 15 and 16 and then pressed into the curve of the clip body 14.

The auxiliary flange 3 (portion B) gets positioned on that side of the flange 6 that is turned away from the flange 15 and will be urged by the resilience of the strip 1 to lie with its plane 11 onto the lower side of the flange 16. In that position the flange 16 is captured with its two longitudinal edges between the projecting longitudinal edge portions 9. FIG. 7, however, shows the auxiliary flange 3 in an angular position relative to the second flange 16, which position will temporarily occur in the initial phase of clamping the clip body around a pipe clip to be fastened, when the first flange 15 engages the head of the fastening screw 7 and causes the latter to tilt outwardly. As soon as the first flange 15 has passed the head of the fastening screw the resilience of the auxiliary flange 3 will cause the fastening screw to tilt inwardly again and engage the slot of the flange 15. The lining 1 is held on the clip body at the first flange 15 by the end portion 1b that is positioned on the outer side in the bend between the annular clip body 14 and the first flange 15.

As remarked hereinabove the invention may also be applied with a pipe-clip consisting of two parts each having flanges at both ends, in which case one part is serving as a pipe support and the other part is functioning as a closure clip. The pipe supporting part will then be provided with a lining that has at both ends a portion B functioning as an auxiliary flange.

I claim:
1. A pipe-clip, comprising:
an annular clip body having on an inner side thereof a lining of an elastomeric material, and having two ends which are bent into first and second flanges which are to be pulled together by means of a fastening screw comprising a threaded shank and a head;
said first flange having an outwardly opening slot for receiving the shank of the fastening screw;
an auxiliary flange comprising a nut for the fastening screw, arranged so as to normally engage a first side face of said second flange which is turned away from said first flange, said auxiliary flange cooperating with the lining on the inner side of the clip body such that said auxiliary flange is bendable away from said second flange through a certain angle about an axis that is located adjacent a bend between said annular clip body and said second flange so as to cause said fastening screw, that is threaded through a slot-like opening in the second flange into said nut, to tilt outwardly;
said auxiliary flange, comprising said fastening nut, and said lining being formed of one strip of elastomeric material, said strip of elastomeric material comprising a main portion covering the inner side of said annular clip body and an extension portion arranged to cover said second flange and to form said auxiliary flange; and
a transverse slit provided in said lining at a transition between said main portion and said extension portion, through which transverse slit, said second flange extends.

2. The pipe-clip of claim 1, wherein said auxiliary flange has a second side face that is slightly sunk relative to an inner circumferential face of said lining, a recess being provided in said second side face for receiving said fastening nut.

3. The pipe-clip of claim 2, wherein said strip of elastomeric material has a second transverse slit at another end thereof, through which said first flange extends.

4. The pipe-clip of claim 2, wherein a respective longitudinal edge portion extends perpendicularly from each of an outer circumferential surface of said lining and from a face of said auxiliary flange that normally engages said first side face of said second flange, said clip body and said second flange being positioned between said longitudinal edge portions.

5. The pipe-clip of claim 4, wherein said strip of elastomeric material has a second transverse slit at another end thereof, through which said first flange extends.

6. The pipe-clip of claim 1, wherein a respective longitudinal edge portion extends perpendicularly from each of an outer circumferential surface of said lining and from a face of said auxiliary flange that normally engages said first side face of said second flange, said clip body and said second flange being positioned between said longitudinal edge portions.

7. The pipe-clip of claim 6, wherein said strip of elastomeric material has a second transverse slit at another end thereof, through which said first flange extends.

8. The pipe-clip of claim 1, wherein said strip of elastomeric material has a second transverse slit at another end thereof, through which said first flange extends.

* * * * *

UNITED STATES PATENT AND TRADEMARK OFFICE
CERTIFICATE OF CORRECTION

PATENT NO. : 5,384,936
DATED : January 31, 1996
INVENTOR(S) : Van Walraven

It is certified that error appears in the above-indentified patent and that said Letters Patent is hereby corrected as shown below:

Title page, Item [57] "ABSTRACT", line 7, change "having a" to --is normally--;

line 9, after "action" insert --,--;

line 14, change "material transverse" to --material. A transverse--

Column 2, line 23, change "8806713" to --8806714--

Signed and Sealed this

Second Day of July, 1996

Attest:

BRUCE LEHMAN

Attesting Officer     Commissioner of Patents and Trademarks